(12) United States Patent
Watanabe et al.

(10) Patent No.: US 9,051,202 B2
(45) Date of Patent: *Jun. 9, 2015

(54) METHOD OF PRODUCING A DISK ROLL

(75) Inventors: Kazuhisa Watanabe, Tokyo (JP); Tetsuya Mihara, Tokyo (JP); Taichi Shiratori, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/383,114

(22) PCT Filed: Jan. 5, 2012

(86) PCT No.: PCT/JP2012/000036
§ 371 (c)(1),
(2), (4) Date: Feb. 19, 2013

(87) PCT Pub. No.: WO2013/102950
PCT Pub. Date: Jul. 11, 2013

(65) Prior Publication Data
US 2013/0174609 A1 Jul. 11, 2013

(51) Int. Cl.
*C03B 13/16* (2006.01)
*C03B 35/18* (2006.01)

(52) U.S. Cl.
CPC .............. *C03B 13/16* (2013.01); *C03B 35/181* (2013.01); *C03B 35/189* (2013.01)

(58) Field of Classification Search
CPC ...... C04B 41/009; C03B 11/02; C03B 13/16; C03B 13/183; C03B 23/02; B28B 2001/00; F16C 2202/02

USPC ............. 428/64.1, 324, 363, 454; 162/40, 59, 162/145; 65/90, 253, 33.7, 374.13, 245; 106/468; 264/219, 679
See application file for complete search history.

(56) References Cited

U.S. PATENT DOCUMENTS

| | | | |
|---|---|---|---|
| 4,533,581 A * | 8/1985 | Asaumi et al. .................. 492/40 |
| 6,896,646 B2 | 5/2005 | Kaiser et al. | |
| 7,507,194 B2 | 3/2009 | Neubauer et al. | |
| 8,827,883 B2 * | 9/2014 | Horiuchi et al. ................. 492/40 |
| 2003/0181302 A1 | 9/2003 | Kaiser et al. | |
| 2004/0220032 A1 | 11/2004 | Nakayama et al. | |
| 2008/0120995 A1* | 5/2008 | Neubauer et al. .......... 65/374.13 |
| 2009/0272151 A1* | 11/2009 | Lacasse et al. ............. 65/374.13 |
| 2010/0064729 A1* | 3/2010 | Nakayama et al. ............... 65/90 |
| 2010/0113238 A1* | 5/2010 | Horiuchi et al. ................ 492/40 |
| 2011/0287915 A1* | 11/2011 | Horiuchi et al. ................ 492/40 |
| 2011/0287916 A1* | 11/2011 | Watanabe et al. .............. 492/40 |
| 2012/0255327 A1* | 10/2012 | Watanabe et al. ................. 65/90 |

(Continued)

FOREIGN PATENT DOCUMENTS

| | | |
|---|---|---|
| JP | 2004-299980 | 10/2004 |
| JP | 2004-299984 | 10/2004 |

(Continued)

*Primary Examiner* — Kevin Bernatz
(74) *Attorney, Agent, or Firm* — Steptoe & Johnson LLP

(57) ABSTRACT

A disk roll includes a shaft, and a plurality of disks that are fitted to the shaft, the plurality of disks fitted having been fired, having a density of more than 1.20 g/cm³ and 1.50 g/cm³ or less, and including 20 to 50 wt % of ceramic wool, 5 to 30 wt % of kibushi clay, 2 to 20 wt % of bentonite, and 20 to 45 wt % of a filler, the filler being selected from mica, alumina, wollastonite, cordierite, and calcined kaolin.

6 Claims, 1 Drawing Sheet

(56) References Cited

U.S. PATENT DOCUMENTS

2012/0272686 A1* 11/2012 Horiuchi et al. ............... 492/59
2014/0221189 A1* 8/2014 Watanabe et al. ............... 501/11

FOREIGN PATENT DOCUMENTS

| JP | 2005-520774 | | | 7/2005 |
|----|----|----|----|----|
| JP | 2009-132619 | | | 6/2009 |
| JP | 2010-510956 | | | 4/2010 |
| JP | 2010-111541 | | | 5/2010 |
| JP | 2011-241920 | | | 12/2011 |
| JP | 2012211052 | A | * | 11/2012 |
| JP | 2013018681 | A | * | 1/2013 |
| WO | WO2012/070650 | A1 | * | 5/2012 |

* cited by examiner

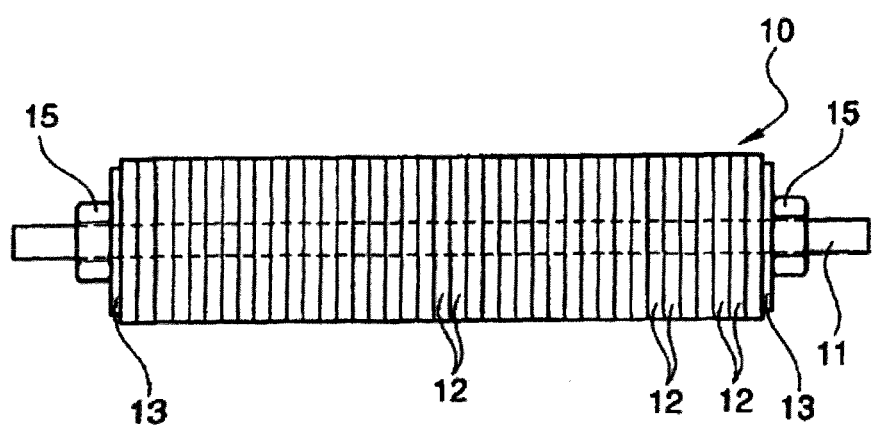

METHOD OF PRODUCING A DISK ROLL

TECHNICAL FIELD

The invention relates to a disk roll that may suitably be used for glass production, a method of producing the same, and a method of producing glass using the same.

BACKGROUND

Sheet glass may be produced by continuously supplying molten glass to an apparatus, and allowing the molten glass to cool and solidify while flowing downward from the apparatus in the shape of a strip. Disk rolls function as a pair of tensile rolls, and are used to hold and move the strip-shaped molten glass.

The disk roll is normally produced by fitting a plurality of ring-shaped disks cut from a millboard (sheet or base material) to a shaft (rotary shaft) to obtain a roll-shaped stack, and pressing and securing the whole stack via a flange disposed at each end of the stack. The outer circumferential surface of the disks serves as a molten glass transfer surface.

Since the disk roll transfers strip-shaped molten glass for a long time, the disk roll is required to have a low wear rate. The disk roll is also required not to contaminate glass due to dust from the surface.

Patent documents 1 to 3 disclose a disk roll that contains heat-resistant inorganic wool, mica, and clay.

RELATED ART DOCUMENTS

Patent Document

Patent Document 1: JP-T-2010-510956
Patent Document 2: JP-A-2009-132619
Patent Document 3: JP-A-2004-299980

SUMMARY OF THE INVENTION

An object of the invention is to provide a disk roll that exhibits excellent wear resistance, a method of producing the same, and a method of producing glass using the same.

The invention provides the following disk roll and the like.

1. A disk roll including:
    a shaft; and
    a plurality of disks that are mounted to the shaft,
    the plurality of disks mounted having been fired and having a density of more than $1.20 \text{ g/cm}^3$ and $1.50 \text{ g/cm}^3$ or less,
    wherein the disks include 20 to 50 wt % of ceramic wool, 5 to 30 wt % of kibushi clay, 2 to 20 wt % of bentonite, and 20 to 45 wt % of a filler, the filler being selected from mica, alumina, wollastonite, cordierite, and calcined kaolin.
2. The disk roll according to 1, wherein the plurality of disks have been fired at 300° C. or more and less than 700° C.
3. The disk roll according to 1 or 2, wherein the plurality of disks have a density of $1.23 \text{ g/cm}^3$ or more and $1.40 \text{ g/cm}^3$ or less.
4. The disk roll according to any one of 1 to 3, wherein the ceramic wool includes 70 wt % or more and 82 wt % or less of alumina, and 18 wt % or more and 30 wt % or less of silica.
5. The disk roll according to any one of 1 to 3, wherein the ceramic wool includes 40 wt % or more and less than 60 wt % of alumina, and more than 40 wt % and 60 wt % or less of silica.
6. A method of producing a disk roll including mounting a plurality of disks to a shaft, and firing the plurality of disks so that the plurality of disks have a density of more than $1.20 \text{ g/cm}^3$ and $1.50 \text{ g/cm}^3$ or less, the plurality of disks including 20 to 50 wt % of ceramic wool, 5 to 30 wt % of kibushi clay, 2 to 20 wt % of bentonite, and 20 to 45 wt % of a filler, the filler being selected from mica, alumina, wollastonite, cordierite, and calcined kaolin.
7. The method of producing a disk roll according to 6, wherein the plurality of disks further include pulp and starch before the plurality of disks are fired.
8. A method of producing glass including transferring molten glass using the disk roll according to any one of 1 to 5, and cooling the molten glass.

The invention thus can provide a disk roll that exhibits excellent wear resistance, a method of producing the same, and a method of producing glass using the same.

BRIEF DESCRIPTION OF THE DRAWINGS

FIG. 1 is a view illustrating an example of a disk roll according to the invention.

DESCRIPTION OF EXEMPLARY EMBODIMENTS

A disk roll according to the invention includes a shaft, and a plurality of disks that are fitted to the shaft.

FIG. 1 illustrates an example of the disk roll according to the invention. A disk roll 10 illustrated in FIG. 1 is produced as described below, for example. Specifically, a plurality of disks 12 are fitted to a shaft 11 to obtain a roll-shaped stack. The entire stack is pressed from each end via a flange 13 disposed at each end of the stack, and is secured using nuts 15 in a state in which the disks are compressed to some extent. The disks are optionally fired, and the outer circumferential surface of the disks is ground to have a given roll diameter.

The disk roll may have a structure in which the entire shaft is covered with the disks (see FIG. 1), a structure in which only an area of the shaft that comes in contact with glass is covered with the disks, a single-axis structure, or the like.

The disk is normally in the shape of a disk having a center hole. The thickness of the disk is not particularly limited, but is normally about 2 mm to about 10 mm. The size and the shape of the center hole may be changed depending on the structure of the shaft. It is preferable that the size and the shape of the center hole be almost identical with the size and the shape of the cross section of the shaft. The shape of the center hole may be circular, square, pentagonal, hexagonal, rhombic, or elliptical, for example. The outer circumferential surface of the disks fitted to the shaft forms the outer circumferential surface of the disk roll. At least part of the outer circumferential surface of the disk roll comes in contact with a glass sheet.

The disk roll according to the invention may be produced by fitting a plurality of disks to a shaft to obtain a stack, and pressing and securing the stack from each end of the stack. The resulting product is preferably fired after securing. The density of the disks of the disk roll thus obtained is more than $1.20 \text{ g/cm}^3$ and $1.50 \text{ g/cm}^3$ or less, preferably more than $1.23 \text{ g/cm}^3$ and $1.40 \text{ g/cm}^3$ or less, and more preferably $1.25 \text{ g/cm}^3$ or more and $1.35 \text{ g/cm}^3$ or less. If the density of the disks is within the above range, the disk roll exhibits excellent wear resistance, so that formation of dust is suppressed. The disk roll having the same hardness exhibits excellent wear resistance when the density of the disks is high.

The density of the disks may be adjusted by changing the composition of the disk, the compressive force applied when securing the disks, and the like.

If the disks are fired, an organic binder is removed, whereby the density of the disks decreases. Therefore, the density of the disks is adjusted taking account of removal of the organic binder when firing the disks fitted to the shaft. For example, when the disk contains about 2 to 10 wt % of an organic binder, the density of the disks is adjusted to about 1.22 g/cm³ to about 1.67 g/cm³.

The Shore hardness of the disks of the disk roll thus obtained is preferably 30 to 68, more preferably 55 to 65, and still more preferably 35 to 65. If the hardness of the disks is within the above range, the disk roll exhibits excellent wear resistance. If the hardness of the disks is too high, glass may be damaged by the disk roll. The hardness of the disks may be adjusted by changing the composition of the disk, the compressive force applied when securing the disks, and the like.

When the disks contain an organic binder, as described above, smoke may be generated from the disks when the disks are heated during use. Therefore, it is preferable to fire the disks in advance. The disks may be fired before or after fitting the disks to the shaft. Note that it is preferable to fire the disks after fitting the disks to the shaft. If the disks are fired after fitting the disks to the shaft, the possibility that the disks undergo compression fracture (failure) when fitting the disks to the shaft is reduced. The firing temperature is 300 to 1000° C., and preferably 400 to 800° C., for example. Note that the firing temperature may be 300° C. or more and less than 700° C., or may be 300° C. or more and less than 650° C. It is advantageous to fire the disks at a low temperature from the viewpoint of the environment, apparatus, and workability.

The shaft is formed of a material that can endure heat applied during glass production. The shaft is normally formed of a metal (e.g., iron).

A plurality of disks may be disposed on the shaft along one area or a plurality of areas, and the disks disposed in each area may be compressively secured from each end using a fixture. Specifically, the disks may not be disposed on part of the shaft. The disks may differ (change) in diameter and cross-sectional shape along the length direction of the shaft.

The disk used in the invention includes 20 to 50 wt % of ceramic wool, 5 to 30 wt % of kibushi clay, 2 to 20 wt % of bentonite, and 20 to 45 wt % of a filler. The filler is one or more materials selected from mica, alumina, wollastonite, cordierite, and calcined kaolin.

The content of the ceramic wool in the disk is 20 to 50 wt %, preferably 25 to 38 wt %, and more preferably 25 to 35 wt %. If the content of the ceramic wool is less than 20 wt %, the heat resistance of the disk may deteriorate. If the content of the ceramic wool exceeds 50 wt %, the wear resistance of the disk may deteriorate due to an increase in void volume.

Aluminosilicate wool, mullite wool, or alumina wool may be used as the ceramic wool used in the invention. The ceramic wool normally includes 40 wt % or more and 99 wt % or less of alumina, and 1 wt % or more and 60 wt % or less of silica. For example, the ceramic wool may be heat-resistant wool that includes 70 wt % or more and 85 wt % or less (preferably 70 wt % or more and 82wt % or less) of alumina, and 15 wt % or more and 30 wt % or less (preferably 18 wt % or more and 30 wt % or less) of silica. Alternatively, the ceramic wool may include 40 wt % or more and less than 60 wt % (preferably 45 wt % or more and 55 wt % or less) of alumina, and more than 40 wt % and 60 wt % or less (preferably 45 wt % or more and 55 wt % or less) of silica.

The ceramic wool normally has an average fiber diameter of about 2μm to about 7 μm, and preferably about 2 μm to about 5 μm, or about 3 μm to about 7 μm.

The content of kibushi clay in the disk is 5 to 30 wt %, preferably 10 to 30 wt %, and more preferably 15 to 25 wt %. If the content of kibushi clay is within the above range, excellent surface lubricity (smoothness) is achieved by a surface treatment that is performed after grinding the disk.

The content of bentonite in the disk is 2 to 20 wt %, preferably 2 to 15 wt %, more preferably 3 to 15 wt %, and still more preferably 5 to 15 wt %. If the disk does not include bentonite, drainage may deteriorate due to insufficient fixation and coagulation. If the content of bentonite is too high, drainage may deteriorate.

Mica allows the disk to easily follow the thermal expansion of the shaft. White mica (muscovite; $K_2Al_4(Si_3Al)_2O_{20}(OH)_4$), black mica, gold mica (phlogopite: $KMg_6(SiAl)_2O_{20}(OH)_4$), palagonite, lepidolite, fluorotetrasilicic mica or the like may be used as mica. Among these, white mica is preferable from the viewpoint of the above followability.

The content of mica in the disk is 20 to 45 wt %, preferably 20 to 40 wt %, and more preferably 25 to 35 wt %. If the content of mica is too low, the disk may not sufficiently follow the thermal expansion of the shaft. If the content of mica is too high, it may be difficult to prepare a slurry in which mica is uniformly dispersed, so that the properties of the resulting disk may vary to a large extent.

The content of alumina, wollastonite, cordierite, or calcined kaolin in the disk is 20 to 45 wt %, preferably 25 to 45 wt %, and more preferably 28 to 42 wt %. If the content of alumina, wollastonite, cordierite, or calcined kaolin is too low, the surface lubricity (smoothness) of the resulting disk roll may deteriorate. If the content of alumina, wollastonite, cordierite, or calcined kaolin is too high, the disk may not be efficiently punched in the shape of a ring.

The disk may further include a coagulant aid and an organic binder as long as the effects of the invention are not impaired.

It is preferable to use organic wool (pulp) and starch as the organic binder. The organic wool (pulp) provides the disk with compressibility. The content of the organic wool (pulp) in the disk may be 2 to 10 wt %, or 6 to 10 wt %. Starch provides the disk with strength. The content of starch in the disk may be 1 to 10 wt %, or 1 to 4 wt %.

The total content of the ceramic wool, kibushi clay, bentonite, and the filler (i.e., inorganic components) in the disk may be 85 wt % or more, 90 wt % or more, 95 wt % or more, 98 wt % or more, or 100 wt %.

If the total content of the ceramic wool, kibushi clay, bentonite, and the filler in the disk is within the above range, a disk roll that exhibits heat resistance, strength, a restoration rate, and the like in a well-balanced manner can be obtained.

The disk is normally obtained by cutting a base material. The base material may be produced by molding (forming) an aqueous slurry including the above components into a sheet, and drying the resulting sheet. It is preferable to produce the base material using a papermaking method from the viewpoint of efficiency.

EXAMPLES

Examples 1 to 4 and Comparative Examples 1 to 4

Production of Disk Roll

An aqueous slurry containing 30 wt % of ceramic wool (alumina: 40 to 60 wt %, silica: 40 to 60 wt %), 32 wt % of white mica, 20 wt % of kibushi clay, 10 wt % of bentonite, 6 wt % of pulp, and 2 wt % of starch was prepared. A disk roll base material (millboard) was produced using a papermaking method so that the dimensions of the base material after drying were 200 mm×200 mm×6 mm.

Disks having an outer diameter of 80 mm and an inner diameter of 30 mm were punched from the base material, and fitted to a stainless steel shaft (diameter: 30 mm). Table 1 shows the compressive pressure (force) applied when securing the disks, and the compressed density of the disks. The length of the stack of the disks was 100 mm. The disks were then fired for 5 hours at the temperature shown in Table 1 to obtain a disk roll.

The post-firing density, the hardness, and the wear amount of the disk roll obtained were determined by the following methods. The results are shown in Table 1.

(1) Compressed Density and Post-Firing Density

The compressed density and the post-firing density were calculated by dividing the weight of the disks (calculated by subtracting the weight of the shaft from the total weight of the disk roll) by the volume of the disk roll.

(2) Hardness

The hardness of the disk roll was measured using a Durometer D hardness meter ("Asker D hardness tester" manufactured by Kobunshi Keiki Co., Ltd.).

(3) Wear Amount

The disk roll was rotated at 800° C. for 5 hours in a state in which the surface of the disk roll came in contact with a stainless steel shaft having a diameter of 30 mm in which five grooves having a width of 2 mm were formed at intervals of 2 mm, and cooled to room temperature (25° C.). The depth of grooves formed in the surface of the disk roll was then measured.

TABLE 1

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Compressive pressure | MPa | 17.2 | 17.2 | 21.1 | 21.1 | 5.6 | 5.6 | 11.0 | 11.0 |
| Compressed density | g/cm³ | 1.40 | 1.40 | 1.50 | 1.50 | 1.10 | 1.10 | 1.25 | 1.25 |
| Firing temperature | ° C. | 400 | 500 | 400 | 500 | 400 | 500 | 400 | 500 |
| Post-firing density | g/cm³ | 1.26 | 1.26 | 1.35 | 1.35 | 0.99 | 0.99 | 1.13 | 1.12 |
| Hardness | ShoreD | 57.2 | 56.9 | 64.4 | 61.2 | 40.5 | 39.1 | 50.3 | 48.8 |
| Wear amount | mm | 0.18 | 0.20 | 0.18 | 0.20 | 0.60 | 0.58 | 0.23 | 0.25 |

As shown in Table 1, the wear amount of the disk rolls of Examples 1 to 4 (post-firing density: >1.20 g/cm³) was lower than that of the disk rolls of Comparative Examples 1 to 4 (post-firing density: ≤1.20 g/cm³).

Examples 5 to 7

A disk roll was produced and evaluated in the same manner as in Example 1 using the compressive pressure, the compressed density, and the firing temperature shown in Table 2 in order to determine the effects of the firing temperature. The results are shown in Table 2. Table 2 also shows the data obtained in Examples 1 and 2 for reference.

TABLE 2

| | | Example 1 | Example 2 | Example 5 | Example 6 | Example 7 |
|---|---|---|---|---|---|---|
| Compressive pressure | MPa | 17.2 | 17.2 | 17.2 | 17.2 | 17.2 |
| Compressed density | g/cm³ | 1.40 | 1.40 | 1.40 | 1.40 | 1.40 |
| Firing temperature | ° C. | 400 | 500 | 600 | 700 | 800 |
| Post-firing density | g/cm³ | 1.26 | 1.26 | 1.24 | 1.23 | 1.23 |
| Hardness | ShoreD | 57.2 | 56.9 | 54.8 | 55.7 | 57.3 |
| Wear amount | mm | 0.18 | 0.20 | 0.14 | 0.10 | 0.20 |

As shown in Table 2, a significant difference in properties was not observed when the firing temperature was 400 to 800° C. i.e., the firing temperature may be reduced to a low temperature.

INDUSTRIAL APPLICABILITY

The disk roll according to the invention may be used to produce sheet glass and the like.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification are incorporated herein by reference in their entirety.

What is claimed is:

1. A method of producing a disk roll, comprising:
   providing a plurality of disks comprising:
      20 to 50 wt % of ceramic wool,
      5 to 30 wt % of kibushi clay,
      2 to 20 wt % of bentonite,
      20 to 45 wt % of a filler selected from the group consisting of mica, alumina, wollastonite, cordierite, and calcined kaolin; and
      the total content of the ceramic wool, kibushi clay, bentonite and a filler is 95 wt % or more;
   firing the plurality of disks so that disks have a density of more than 1.20 g/cm³ and 1.50 g/cm³ or less, and a Shore D hardness of 30 to 68,
   and after firing mounting a plurality of disks onto a shaft.

2. The method of producing a disk roll according to claim 1, wherein the plurality of disks further comprise pulp and starch before the plurality of disks are fired.

3. The method according to claim 1, wherein the plurality of disks are fired at 300° C. or more and less than 700° C.

4. The method according to claim 1, wherein the plurality of fired disks have a density of 1.23 g/cm$^3$ or more and 1.40 g/cm$^3$ or less.

5. The method according to claim 1, wherein the ceramic wool comprises 70 through 82 wt % alumina, and 18 through 30 wt % silica.

6. The method according to claim 1, wherein the ceramic wool comprises 40 wt % but less than 60 wt % of alumina, and more than 40 wt % through 60 wt % silica.

\* \* \* \* \*